United States Patent [19]

Pentland

[11] Patent Number: 5,287,529
[45] Date of Patent: Feb. 15, 1994

[54] METHOD FOR ESTIMATING SOLUTIONS TO FINITE ELEMENT EQUATIONS BY GENERATING PYRAMID REPRESENTATIONS, MULTIPLYING TO GENERATE WEIGHT PYRAMIDS, AND COLLAPSING THE WEIGHTED PYRAMIDS

[75] Inventor: Alex P. Pentland, Cambridge, Mass.

[73] Assignee: Massachusetts Institute of Technology, Cambridge, Mass.

[21] Appl. No.: 570,521

[22] Filed: Aug. 21, 1990

[51] Int. Cl.[5] .................. G06F 15/31; G06F 15/32
[52] U.S. Cl. .................. 395/800; 364/224;
  364/DIG. 1; 364/724.01; 364/724.05;
  364/724.12; 364/725; 364/726; 364/735;
  364/736
[58] Field of Search ........... 395/800; 364/194, 724.01,
  364/724.05, 735, 724.12, 725, 726, 736; 358/30,
  141

[56] References Cited

U.S. PATENT DOCUMENTS

| | | | |
|---|---|---|---|
| 4,674,125 | 6/1987 | Carlson et al. | 382/49 |
| 4,718,104 | 1/1988 | Anderson | 382/41 |
| 4,817,182 | 3/1989 | Adelson et al. | 382/56 |
| 4,819,161 | 4/1989 | Konno et al. | 364/191 |
| 4,855,903 | 8/1989 | Carleton et al. | 395/325 |
| 4,908,863 | 3/1990 | Taguchi et al. | 381/36 |
| 4,932,061 | 6/1990 | Kroon et al. | 381/30 |
| 5,010,405 | 4/1991 | Schreiber et al. | 358/141 |
| 5,068,911 | 11/1991 | Resnikoff et al. | 382/56 |
| 5,148,497 | 9/1992 | Pentland et al. | 382/54 |
| 5,148,498 | 9/1992 | Resnikoff et al. | 382/54 |
| 5,214,678 | 5/1993 | Rault et al. | 375/122 |

OTHER PUBLICATIONS

Mallat, "A Theory for Multiresolution Signal Decomposition: The Wavelet Representation", IEEE, Jul. 1989, pp. 674-693.

Primary Examiner—Thomas C. Lee
Assistant Examiner—Paul Harrity
Attorney, Agent, or Firm—Fish & Richardson

[57] ABSTRACT

An apparatus for estimating the solution to a finite element analysis and/or regularization equation, the apparatus including means for generating a pyramid representation of input data, each level of the pyramid representation corresponding to a different set of similar eigenvectors; means for multiplying at least one of the levels of the representation by a weight derived from the eigenvalue associated with the set of eigenvectors for that level to generate a weighted pyramid representation; and means for collapsing the weighted pyramid representation to generate an estimated solution to the equation.

18 Claims, 7 Drawing Sheets

STEP 100 — GENERATING A PYRAMID REPRESENTATION OF INPUT DATA WHEREIN EACH LEVEL OF THE PYRAMID REPRESENTATION CORRESPONDS TO A DIFFERENT SET OF SIMILAR EIGENVECTORS.

STEP 110 — MULTIPLYING AT LEAST ONE OF THE LEVELS OF THE REPRESENTATION BY A WEIGHT DERIVED FROM THE EIGENVALUE ASSOCIATED WITH THE SET OF EIGENVECTORS FOR THAT LEVEL TO GENERATE A WEIGHTED PYRAMID REPRESENTATION.

STEP 120 — COLLAPSING THE WEIGHTED PYRAMID REPRESENTATION TO GENERATE AN ESTIMATED SOLUTION TO THE EQUATION.

METHOD FOR ESTIMATING SOLUTIONS TO FINITE ELEMENT EQUATIONS BY GENERATING PYRAMID REPRESENTATIONS, MULTIPLYING TO GENERATE WEIGHT PYRAMIDS, AND COLLAPSING THE WEIGHTED PYRAMIDS

The Government has rights in this invention pursuant to contract Number F-30602-89-C-0022 awarded by the Department of the Air Force.

BACKGROUND OF THE INVENTION

The invention relates to systems for solving finite element method (FEM) equations.

The equilibrium governing equation in the finite element method (FEM) may be written as follows:

$$KU = R, \quad (1)$$

where K is a stiffness matrix, U is a displacement vector specifying the unknown nodal displacements, and R is a load vector. The load vector includes the effect of element body forces, the element surface forces and the element initial stresses and concentrated loads on the assemblage of elements or nodes. The stiffness matrix describes the structural properties and inter-element interactions within the body of elements being characterized. In the FEM, the calculation of K is accomplished by integrating material properties over a set of nodes. Descriptions of the commonly used techniques for calculating K are found in many standard texts on finite element analysis. (See, for example, J. Bathe, *Finite Element Procedures in Engineering Analysis*, Prentice-Hall, 1982 and L. J. Segerlind, *Applied Finite Element Analysis*, John Wiley and Sons, 1984.)

There are many ways to solve Eq. 1, however, because of the typically large size of the K matrix direct integration methods are preferred. For example, a first-order iterative solution technique is commonly used:

$$u^{t+1} = U^t - \frac{\Delta t}{c}(KU^t - R), \quad (2)$$

where $\Delta t$ is the integration time step and c is the system damping factor. This solution is equivalent to direct integration of $$C\ddot{U} + KU = R, \quad (3)$$

where C is a diagonal matrix whose entries are the damping factor c.

A much more efficient approach to solving Eq. 1 is to employ a second-order solution technique such as the Central Difference Method (CDM) for dynamic analysis. Such a second order solution technique is equivalent to direct integration of:

$$M\ddot{U} + C\dot{U} + KU = R \quad (4)$$

for some $n \times n$ matrices M and c.

In the FEM, the matrix M is interpreted as a mass matrix describing the distribution of mass within the body, and c is interpreted as a damping matrix describing the body's internal dissipation of energy. The process of direct integration is interpreted as stepping forward by fixed time increments to simulate the reaction of the body to a load R. The equilibrium nodal displacements U describe the shape of the body after it has come to rest, and are the solution to the initial loading problem given by Eq. 1.

Referring to Eq. 4, to obtain an equilibrium solution U, one integrates the equation using an iterative numerical procedure (such as CDM) at a cost of roughly $3nm_k$ operations per time step, where n is the order of the stiffness matrix and $m_k$ is its half bandwidth. (See Bathe, Appendix A.2.2 and Segerlind for complete discussions on the bandwidth of a stiffness matrix.) Thus, there is a need for a method which transforms the Eq. 4 into a form which leads to a less costly solution. Since the number of operations is proportional to the half bandwidth mk of the stiffness matrix, a reduction in $m_k$ will greatly reduce the cost of step-by-step solution.

To accomplish this goal a transformation of the nodal point displacements U can be used:

$$U = P\tilde{U}, \quad (5)$$

where P is a square transformation matrix and U is a vector of generalized displacements. Substituting Eq. 5 into Eq. 4 and premulti by $P^T$ yields:

$$\tilde{M}\ddot{\tilde{U}} + \tilde{C}\dot{\tilde{U}} + \tilde{K}\tilde{U} = \tilde{R} \quad (6)$$

where $$\tilde{M} = P^T M P; \ \tilde{C} = P^T C P; \ \tilde{K} = P^T K P; \ \tilde{R} = P^T R.$$

With this transformation of basis set a new system of stiffness, mass and damping matrices can be obtained which has a smaller bandwidth then the original system.

The optimal transformation matrix is derived from the free vibration modes of the equilibrium equation. This can be seen by examining the undamped case. Under the assumption of no damping, the governing equation reduces to:

$$M\ddot{U} + KU = R \quad (7)$$

From this, an eigenvalue problem can be derived which will determine an optimal transformation basis set $\phi$:

$$K\phi = \omega^2 \phi M \quad (8)$$

The eigenvalue problem in Eq. 8 yields n eigensolutions:

$$(\omega_1^2, \phi_1), (\omega_2^2, \phi_2), \ldots, (\omega_n^2, \phi_n),$$

where all the eigenvectors are M-orthonormalized. Hence, $$\phi_i^T M \phi_j = \begin{cases} = 1; i = j \\ = 0; i \neq j \end{cases} \quad (9)$$

and $$0 \leq \omega_1^2 \leq \omega_2^2 \leq \omega_3^2 \leq \ldots \leq \omega_n^2 \quad (10)$$

The vector $\phi_i$ is the $i^{th}$ mode shape vector and $\omega_i$ is the corresponding frequency of vibration. Now I define a transformation matrix $\Phi$, which has for its columns the eigenvectors $\phi_i$, and a diagonal matrix $\Omega^2$, with the eigenvalues $\omega_i^2$ on its diagonal:

$$\Phi = [\phi_1, \phi_2, \phi_3, \ldots, \phi_n] \quad (11)$$

$$\Omega^2 = \begin{bmatrix} \omega_1^2 & & & & \\ & \omega_2^2 & & & \\ & & \omega_3^2 & & \\ & & & \ddots & \\ & & & & \omega_n^2 \end{bmatrix}$$

Equation 8 can now be written as:

$$K\Phi = \Omega^2 \Phi M, \quad (12)$$

and since the eigenvectors are M-orthonormal:

$$\Phi^T K \Phi = \Omega^2 \quad (13)$$

$$\Phi^T M \Phi = I. \quad (14)$$

From the above formulations, it becomes apparent is the optimal transformation matrix P for systems in which damping effects are negligible, since for this transformation the equilibrium equation is reduced to $$\ddot{\tilde{U}} + \Omega^2 \tilde{U} = \Phi^T R(t) \quad (15)$$

or, equivalently, to n independent and individual equations of the form $$\ddot{\tilde{U}}_i(t) + \omega_i^2 \tilde{U}_i(t) = r_i(t) \quad (916)$$

where $r_i(t) = \Phi_i^T R(t)$ for $i = 1, 2, 3, \ldots, n$.

Applying this transformation to the equilibrium governing equation (Eq. 1) yields the following results:

$$K \Phi \tilde{U} = R. \quad (17)$$

Multiplying both sides of Eq. 17 by $\Phi^T$:

$$\Phi^T K \Phi \tilde{U} = \Phi^T R, \quad (18)$$

which, using Eq. 13, becomes:

$$\Omega^2 \tilde{U} = \Phi^T R, \quad (19)$$

or, equivalently:

$$\tilde{U} = \Omega^{-2} \Phi^T R. \quad (20)$$

To get back to the original nodal point displacement reference system, the transform $\Phi$ is applied to both sides of Eq. 20:

$$\Phi \tilde{U} = U = \Phi \Omega^{-2} \Phi^T R = W R, \quad (21)$$

where $W = \Phi \, \Omega^{-2} \, \Phi^T$.

In other words, using transformation $\Phi$ yields a closed form solution that can be computed by multiplying R by W. Since W may be precomputed, the number of operations required at the time of computing U is $O(n^2)$, a significant improvement over the $O(n^3)$ operations required for the previously described integration methods. Nevertheless, this technique still requires a very substantial amount of precomputation. More seriously, however, whenever discontinuities are introduced into the system the stiffness matrix w must be recomputed. Even if perturbation methods are employed to recompute W, the computational costs can be significant. It is desirable, therefore, to find a simpler, more efficient method of calculating W, of performing the multiplication of W and R, and of compensating for the introduction of discontinuities.

SUMMARY OF THE INVENTION

In general, in one aspect, the invention is an apparatus for estimating the solution to a finite element and/or regularization analysis equation. The invention includes means for generating a pyramid representation of input data, each level of the pyramid representation corresponding to a different set of similar eigenvectors; means for multiplying at least one of the levels of said representation by a weight derived from the eigenvalue associated with the set of eigenvectors for that level to generate a weighted pyramid representation; and means for collapsing the weighted pyramid representation to generate an estimated solution to the equation.

Preferred embodiments include the following features. The different sets of eigenvectors are selected from an orthogonal set of basis functions. The members of the set of similar eigenvectors for a given level include translated versions of each other. At least some members of the set of similar eigenvectors for each level are scaled versions of the members of the set of similar eigenvectors for a neighboring level. The basis set includes wavelets. The pyramid representation generating means includes a plurality of quadrature mirror analysis filters, each for generating a different level of the pyramid representation. Each quadrature mirror analysis filter generates a low frequency output and a high frequency output and each level of the representation above the lowest level is derived by applying the corresponding quadrature mirror analysis filter to the low frequency output of the next lower level. Each of the plurality of quadrature mirror analysis filters is the same. The collapsing means includes a plurality of quadrature mirror synthesis filters. The weight for each level is characterized by the following matrix:

$$\begin{bmatrix} \omega_{1,1}^{-2} & & & & \\ & \omega_{1,2}^{-2} & & & \\ & & \ddots & & \\ & & & & \omega_{1,j}^{-2} \end{bmatrix},$$

where l is an integer identifying the level, j is a number identifying a node for that level and $\omega_{1,j}^2$ is the eigenvalue associated with the eigenvector for level l and node j. In a special case, $w_{1,j}^2 = \omega_1^2$ for all j at level l.

In general, in another aspect, the invention is a method for estimating the solution to a finite element and/or regularization analysis equation. The method includes generating a pyramid representation of input data, each level of the pyramid representation corresponding to a different set of similar eigenvectors; multiplying at least one of the levels of said representation by a weight derived from the eigenvalue associated with the set of eigenvectors for that level to generate a weighted pyramid representation; and collapsing the weighted pyramid representation to generate an estimated solution to the equation.

Preferred embodiments include the following features. The pyramid representation is generated by using quadrature mirror analysis filters. The weighted pyramid representation is collapsed by using quadrature mirror synthesis filters.

An advantage of the invention is that it requires significantly fewer operations, namely, on the order of O(n) operations, to generate an estimate of solutions to finite element method equations. Thus, computations which previously took an impractically long time even on powerful computers can be done within more realistic time scales. In the past, finite element analysis frequently could not be used because results were needed more quickly than could be achieved using the prior calculation methods. The invention makes finite element analysis a much more practical and available tool for many engineering, design and analysis problems.

Other advantages and features will become apparent from the following description of the preferred embodiment and from the claims.

DESCRIPTION OF THE PREFERRED EMBODIMENT

FIG. 4b is one of a wavelet stiffness matrix $K_w$ for the 1-D problem of FIG. 4a;

FIG. 4c is one row of a two-node finite element stiffness matrix for the 1-D problem of FIG. 4a;

FIG. 6b shows the results of applying the iterative process of the invention to the data of FIG. 6a.

STRUCTURE AND OPERATION

The invention exploits special properties of a particular class of orthonormal basis functions to significantly reduce the computational burden of computing the solution to finite element method equations. In the described embodiment, the class of orthonormal basis functions is referred to as wavelet representations or wavelets. It is assumed that the reader is familiar with the publicly available literature regarding these representations. For further information about wavelets see, for example, S. G. Mallat, "A Theory for Multiresolution Signal Decomposition: The Wavelet Representation", IEEE Transactions on Pattern Analysis and Machine Intelligence, 11(7):674–693 (July, 1989); Y. Meyer, "Principe d'inoertitude, bases hilbertiennes et algebres d'operateurs", Bourbaki Seminar, No. 662, 1985–1986; and A. Grossmann et al., "Decomposition of Hardy functions into square integrable wavelets of constant shape", SIAM J. Math, 15:723–736 (1984).

In general, wavelets form orthonormal basis sets that are localized in both space and frequency and that can also be localized in orientation. A 1-D example of five elements 2, 4, 6, 8 and 9 of such a basis set $\Phi_w$ together with the Fourier power spectrum of each element is shown in FIG. 1. Each wavelet depicted in FIG. 1 is a scaled version of the next lower wavelet. The scale factor is two.

Wavelets have at least three properties which make them particularly useful as tools for solving a general class of finite element method equations. They form orthonormal basis sets, the members of which are scaled and translated versions of each other, and they are localized in space, frequency and orientation.

Because $\Phi_w$ is an orthonormal basis set, it satisfies the following relationship $I = \Phi_w^T \Phi_w$. Moreover, as a consequence of their orthonormality, the basis set $\Phi_w$ are the eigenvectors for a class of positive definite symmetric matrices:

$$K_2 \Phi_w \Omega^2 \Phi_w^T \tag{22}$$

where $\Omega^2$ is diagonal with positive entries. Matrices, $K_w$, are of the same form as the above-described stiffness matrices. Thus, leaving aside for a moment the physical significance of this new stiffness matrix, $K_w$, it defines a finite element method equation of the following form:

$$K_w U = R. \tag{23}$$

As before, the basis set $\Phi_w$ may be used to generate a new displacement vector $\tilde{U}$ (i.e., $U = \Phi_w \tilde{U}$). Thus, Eq. 23 becomes:

$$K_w \Phi_w \tilde{U} = R. \tag{24}$$

Multiplying both sides by the transform of $\Phi_w$ (i.e., $\Phi_w^T$) yields:

$$\Phi_w^T K_w \Phi_w \tilde{U} = \Phi_w^T R. \tag{25}$$

Using Eq. 22, this can be written as:

$$\Omega^2 \tilde{U} = \Phi_w^T R, \text{ or} \tag{26}$$

$$\tilde{U} = \Omega^{-2} \Phi_w^T R. \tag{27}$$

Transforming back to the original displacement vector, U, yields:

$$\Phi_w \tilde{U} = U = \Phi_w \Omega^{-2} \Phi_w^T R. \tag{28}$$

Because the wavelets in the basis set $\Phi_w$ are also scaled versions of each other, they may be generated by recursively applying a quadrature mirror filter bank (QMF) to the wavelet representing the highest vibration mode, which, for example, in FIG. 1 is wavelet 2. (Indeed, the wavelets shown in FIG. 1 were generated by use of a five level pyramid based on a 9-tap QMF set.) Thus, the expression, $\Phi_w^T R$, may also be computed by recursively applying QMF's to generate a pyramid data structure corresponding to the result of that matrix multiplication operation. The techniques for using QMF's to generate pyramid data structures are well known and are described in publicly available references including, for example, E. H. Adelson et al., "Orthogonal pyramid transforms for image coding", Proceedings of SPIE, 845:50-58 (October, 1987); E. P. Simoncelli, "Non-Separable Extensions of Quadrature Mirror Filters to Multiple Dimensions", Proceedings of the IEEE, Vol. 78, No. 4, pp. 652-664 (April, 1990).

After the pyramid data structure representing $\Phi_w^T R$ is obtained, each level of the pyramid data structure is multiplied by the associated diagonal element of $\Omega^{-2}$, i.e., $\omega_i^{-2}$ where $\omega_i$ is the frequency of vibration corresponding to the associated eigenvector (i.e., wavelet). Then, the resulting pyramid data structure is collapsed to yield U. By using recursively applied QMF's to compute $\Phi_w \Omega^{-2} \Phi_w^T RR$ in this way, the number of required computations becomes O(n) for a problem of n nodes, as compared to $O(n^3)$ or $O(n^2)$ under the prior art approaches. Particularly for large matrices, i.e., those containing $10^4$ or more nodes, the cost savings in terms of reduced computational burden becomes substantial.

Because of the localized character of the wavelets, the introduction of discontinuities such as boundaries, for example, has a minimal effect on the resulting solution.

Figure 1A:
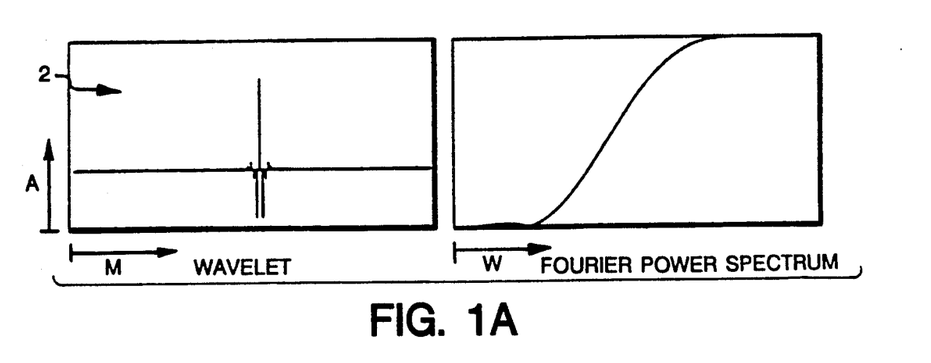
FIG. 1a shows one element of a wavelet basis set and its Fourier power spectrum.
Figure 1B:
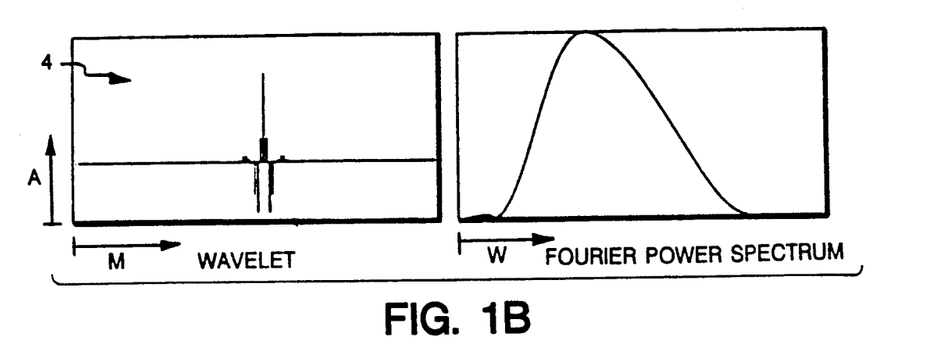
FIG. 1b shows a second element of the wavelet basis set and its Fourier power spectrum.
Figure 1C:
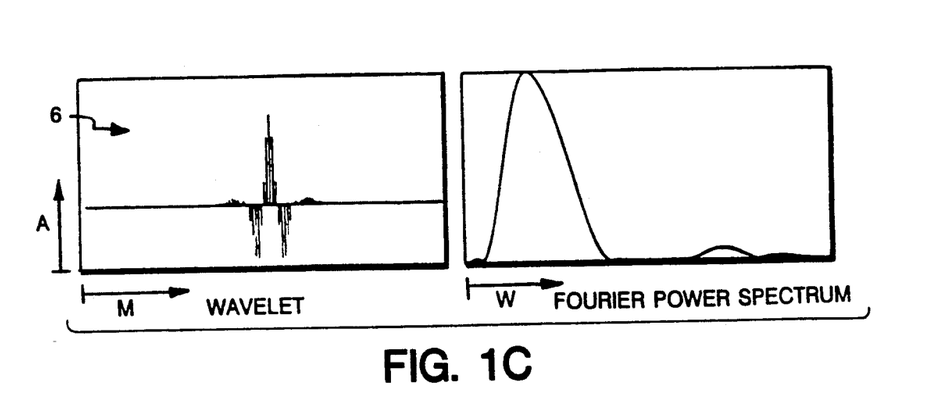
FIG. 1c shows a third element of the wavelet basis set and its Fourier power spectrum.
Figure 1D:
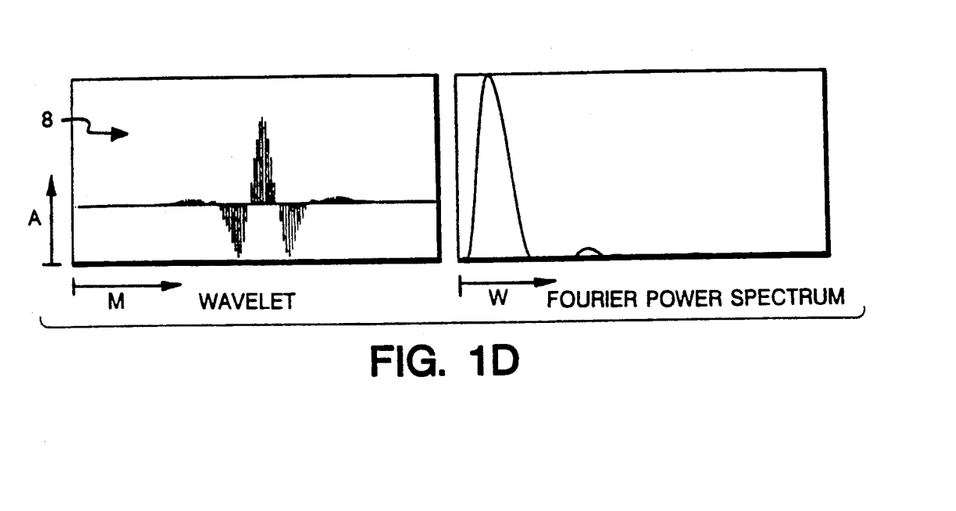
FIG. 1d shows a fourth element of the wavelet basis set and its Fourier power spectrum.
Figure 1E:
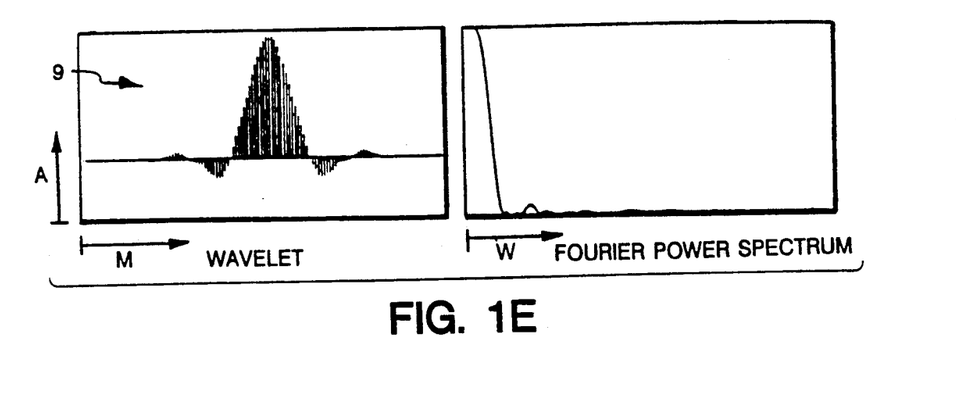
FIG. 1e shows a fifth element of the wavelet basis set and its Fourier power spectrum.
Figure 2:
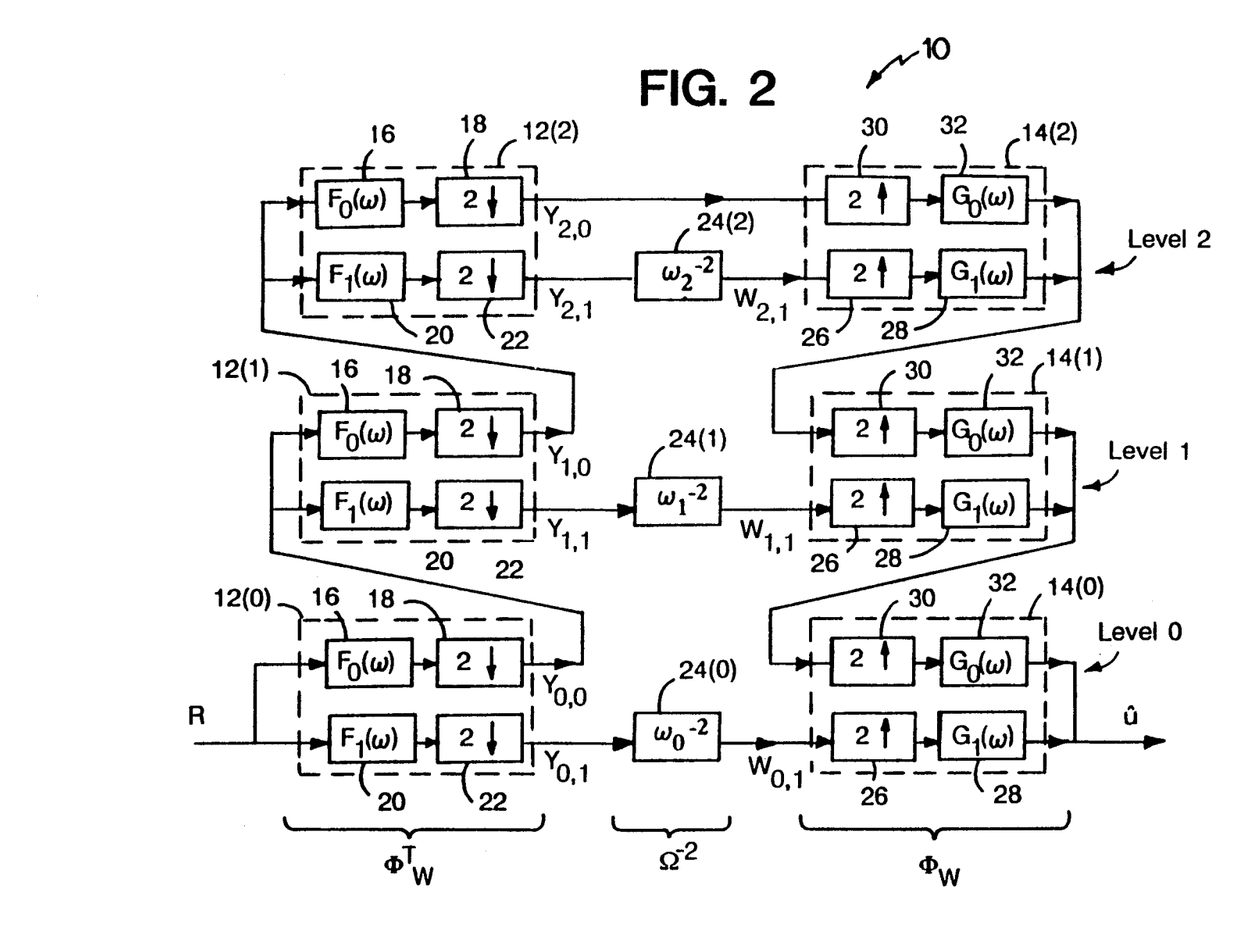
FIG. 2 is a block diagram of a three-level circuit for estimating the solution to a finite element method equation through generation of a pyramid data representation.

FIG. 2 is a block diagram of a circuit 10 used to compute $\Phi_w \Omega^{-2} \Phi_w^T R$ for a one dimensional problem using the procedure outlined above. The representations used in the block diagram are consistent with those used by Simoncelli et al. in the previously-cited reference. In particular, boxes containing $F_i(\omega)$ indicate convolution of an input sequence with a filter having impulse response $f_i[n]$ and discrete time Fourier transform (DTFT):

$$F_i(\omega) = \Sigma_n f_i[n] e^{-j\omega n}. \tag{29}$$

Boxes containing $G_i(\omega)$ indicate convolution of an input sequence with a filter having impulse response $g_i[n]$ and DTFT:

$$G_i(\omega) = \Sigma_n g_i[n] e^{-j\omega n}. \tag{30}$$

Boxes containing 2 ↑ indicate that the sequence is subsampled by a factor of 2 and boxes containing 2 ↓ indicate that the sequence is upsampled by inserting a zero between each sample.

As shown in FIG. 2, circuit 10 has three levels, identified as Level 0, Level 1 and Level 2, respectively. Each level "1" contains a QMF analysis module 12(1) and a corresponding QMF synthesis module 14(1). Each QMF analysis module 12(1) includes a low-pass filter 16 followed by a down-sampler 18 for generating a low-pass signal $Y_{1,0}$ and a high-pass filter 20 followed by a down-sampler 22 for generating a high-pass component $Y_{1,1}$. The recursive nature of circuit 10 is reflected by the fact that Level 0 processes input signal R to generate its associated low-pass and high-pass signal components, and each level above Level 0 processes the low frequency signal component generated by the immediately preceeding lower level to generate the low-pass and high-pass signal components for that level. As indicated in FIG. 2, this phase of the circuit's operation corresponds to the multiplication of R by $\Phi_w^T$.

At each level of the pyramid, the associated high-pass signal component, namely, the corresponding one of $Y_{0,1}$, $Y_{1,1}$, or $Y_{2,1}$, is passed through a multiplier 24(1) to generate a weighted signal component $W_{1,1}$, where "1" signifies the level. Each multiplier 24(1) multiplies all of the elements of the high-pass signal component which it processes by $\omega_1^{-2}$, the inverse square of the frequency associated with the wavelet eigenvectors of that level. This phase of the operation corresponds to the step of multiplying $\Phi_w^T R$ by $\Omega^{-2}$.

Finally, the last stage of circuit 10, represented by QMF synthesis modules 14(1), collapses the resulting pyramid data structure to produce an output signal representing Ũ, an estimate of U. Each QMF synthesis module 14(1) includes an up-sampler 26 followed by a synthesis filter 28 for processing the corresponding weighted signal component $W_{1,1}$ and it includes a second upsampler 30 and a second synthesis filter 32 for processing a combined signal component from the next higher level. In the case of level 2, upsampler 30 and synthesis filter 32 processes the low-pass signal component, $Y_{2,0}$. The output of synthesis filters 28 and 32 of level 2 are then combined and passed to upsampler 30 and synthesis filter 32 of level 1. Similarly, the outputs of synthesis filters 28 and 32 of Level 1 are combined and passed to upsampler 30 and synthesis filter 32 of Level 0. At Level 0, the outputs of synthesis filters 28 and 32 are combined to produce Ũ.

In general, in a QMF bank it can be shown that the frequency responses of the component filters are related in the following way:

$$F_0(\omega) = G_0(-\omega) = H(\omega) \tag{31}$$

$$F_1(\omega) = G_1(-\omega) = e^{j\omega} H(-\omega + \pi), \tag{32}$$

where $H(\omega)$ is an arbitrary function of $\omega$. In the described embodiment, $H(\omega)$ corresponds to the frequency response of a function selected from a orthonormal basis set, such as, for example, one of the wavelets described earlier. That is, the impulse responses $f_0[n]$ and $f_1[n]$ of low-pass filter 16 and high-pass filter 20, respectively, correspond to odd tap kernels defined by wavelets. As should be evident from FIG. 1, the wavelets exhibit band-splitting transform characteristics as desired. And, as noted by Adelson et al. in a previously cited reference, the high-pass kernel, $f_1[n]$, can be readily derived from the low-pass kernel, $f_0[n]$, by multiplying by $s[n] = (-1)^n$.

The low-pass basis set represented by $f_1[n]$ is achieved by translating this low-pass kernel by steps of two nodes. This is equivalent to convolving $f_1[n]$ with the input signal and then taking every other sample as is represented by the filter followed by the subsampling operation in circuit 10 of FIG. 2. The high-pass kernel must be staggered with respect to the low-pass kernel by one node. That is, the high-pass decimation, as represented by the subsampling operation following the $F_1(\omega)$ filter, is preceded by a one-sample delay.

Although the embodiment shown in FIG. 2 included only two recursive levels beyond the first level, other implementations may include either more or fewer levels of recursion depending upon the level of accuracy that is desired. Of course, including more levels of recursion increases the number of computations required. Because of the downsampling at each higher level, however, the increase is only proportional to n/2 for each successive level added.

Due to the scalability of the wavelets, it can readily be shown that each level corresponds to convolving the original data by the "next" largest wavelet in the orthonormal basis set, i.e., the next eigenvector. The "next" largest wavelet has approximately twice the number of taps as the preceding wavelet and its associated frequency 1 is one half that of the preceding level. That is, the "next" largest wavelet corresponds to a next lower harmonic mode of the system. The output at each level corresponds to multiplying the date by translated versions of the same eigenvector and the eigenvectors used for each level are scaled versions of the eigenvector of the next lower level.

For simplicity and ease of description, a one dimensional implementation was used to illustrate the invention. Using QMF's to generate pyramid representations for higher dimensional problems, however, is well known to those skilled in the art. For example, see U.S. Pat. No. 4,817,182 entitled "Truncated Subband Coding of Images" to Adelson et al. and U.S. Pat. No. 4,523,230 entitled "System for Coring an Image-Representing Signal" to Carlson et al., both of which are incorporated herein by reference. By applying the above-described principles to the known techniques for generating the higher dimensional pyramid representations, one can readily solve finite element method equations for higher dimensional problems.

As indicated above, the wavelet basis $\Phi_w$ provides an O(n) closed-form solution to a finite element method equation characterized by stiffness matrix $K_w$. It can also be shown that $K_w$ is a valid and physically meaningful stiffness matrix.

The conditions for $K_w$ to be a valid stiffness matrix are that it must satisfy the following equation:

$$K_2 = \int_S B^T E B \, dS \tag{33}$$

for some choice of polynomial interpolants B. In this equation, E represents the local elasticity matrix and B represents the strain-displacement matrix. In general, a stiffness matrix K is constructed by integration of interpolants over the domain of interest $$K = \int_S B^T E B \, dS \tag{34}$$

for some choice of smooth interpolant function strain-displacement interpolant functions B. (A derivation of this equation and a discussion of the interpolants H and B, can be found in publicly available texts on finite element method analysis, such as, for example, J. Bathe, *Finite Element Procedures in Engineering Analysis*, Prentice-Hall, 1982.)

Figure 3:
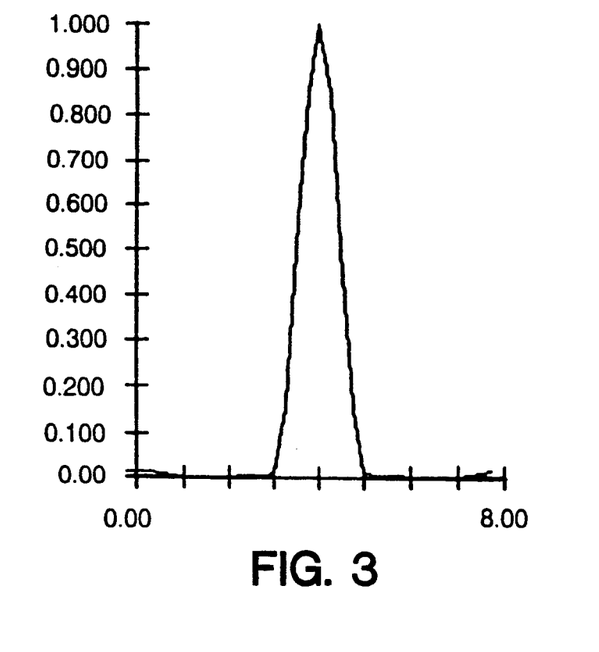
FIG. 3 is a wavelet-derived interpolant used to define a stiffness matrix.

In this case, the following choice is made:

$$H = \phi \, \Phi_w^T \quad B = (d\phi/ds)\Phi_w^T \tag{35}$$

where in the one-dimensional case $\phi$ and $d\phi/ds$ are $n \times 1$ matrices:

$$\phi = [\phi_1(s), \phi_2(s), \ldots, \phi_n(s)] \tag{36}$$

$$d\phi/ds = [d\phi_1(s)/ds, d\phi_2(s)/ds, \ldots, d\phi_n(s)/ds] \tag{37}$$

where the $\phi_i(s)$ are the analytic wavelet function opposed to the discrete or sampled wavelets from the columns of $\Phi$), and E = E (Young's modulus). Note that the wavelets $\phi$ must be chosen so that their derivatives form an orthogonal basis set. An example of one of the interpolant functions H is shown in FIG. 3, where the horizontal axis identifies node number and the vertical axis represents amplitude of the interpolant function. It can be seen that the interpolant satisfies the constraint that it has unit value at a single node, and is zero at other nodes.

With this choice, the right side of Eq. 33 becomes:

$$\int_S B^T E B \, dS = E\Phi_w \int_S (d\phi^T/ds)(d\phi/ds) dS \Phi_w^T \tag{38}$$
$$= \Phi_w^T \Omega^2 \Phi_w$$
$$= K_w$$

where $\Omega^2$ is a diagonal matrix whose entries are the area under the functions $E(d\phi_i(s)/ds)^2$, thus demonstrating that $K_w$ is a valid stiffness matrix. Higher dimensional problems are handled similarly.

Figure 4A:
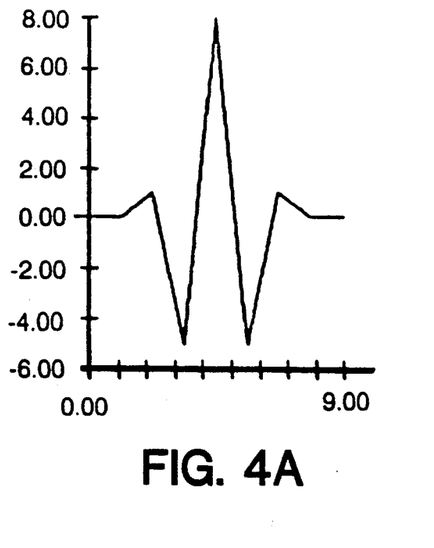
FIG. 4a is one row of a thin-plate stiffness matrix for a 1-D problem.
Figure 4B:
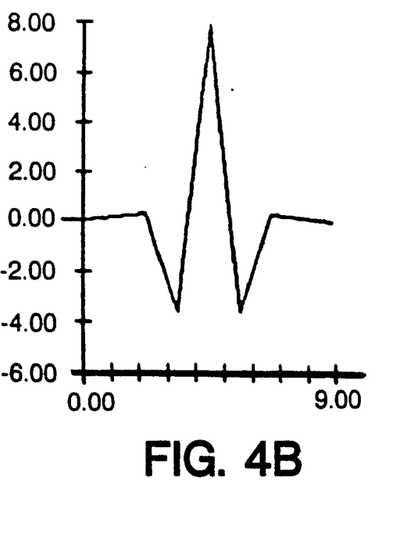
Figure 4C:
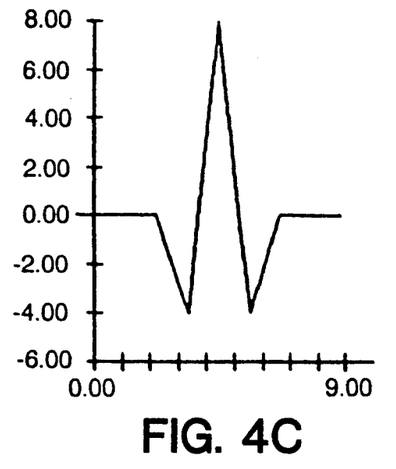

To determine if $K_w$ is physically meaningful, the distribution of nodal stress must be examined. The distribution of stress can be examined by starting with the equilibrium equation:

$$K_w U = R \tag{39}$$

and perturbing a single node $u_i$ to produce a loading R on the surrounding nodes. FIGS. 4a-c show the loading distribution obtained for a 1-D problem using (a) a thin-plate finite difference stiffness matrix, (b) the stiffness matrix $K_w$ constructed using the 9-tap QMF shown in FIG. 1a, and (c) a standard finite element stiffness matrix computed using a two-node element. It can be seen that the three loading distributions are quite similar, with the stiffness matrix $K_w$ being approximately the average of the thin-plate and the two-node stiffness matrices. This similarly indicates that $K_w$ is a physically meaningful stiffness matrix.

The most significant difference between these load distributions is that the loading obtained with $K_w$ extends smoothly across a large number of nodes, while the thin-plate and two-node stiffness matrices truncate sharply after just a few nodes. The smooth distribution of load over a large number of nodes generally leads to greater accuracy in the estimation of internal stresses.

Figure 5A:
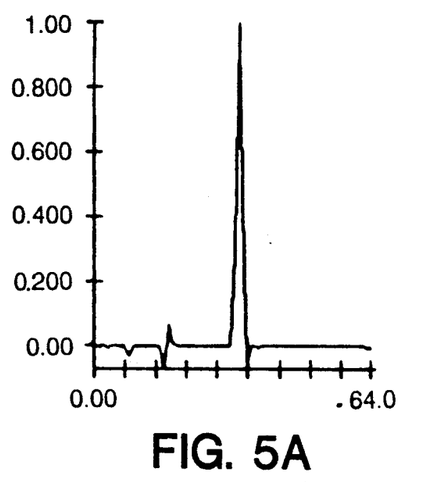
FIG. 5a shows the results of using $\Phi_w$ to diagonalize a thin-plate stiffness matrix.
Figure 5B:
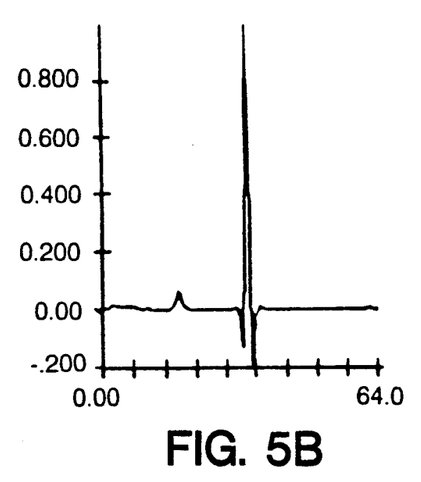
FIG. 5b shows the results of using $\Phi_w$ to diagonalize a three-node stiffness matrix.

A final check on the appropriateness of $K_w$ is the extent to which its eigenvectors, $\Phi_w$, also diagonalize conventional stiffness matrices. FIG. 5a shows a row from $\tilde{K}_{thin\,plate} = \Phi_w^T K_{thin\,plate} \Phi$ and FIG. 5b shows a row from $\tilde{K}_{three\,node} = \Phi_w^T K_{three\,node} \Phi$, where $K_{thin\,plate}$ is a thin-plate stiffness matrix, and $K_{three\,node}$ is a three-node finite element stiffness matrix. It can be seen that $\Phi_w$ is effective at diagonalizing both of these stiffness matrices. A measure of how well $\Phi_w$ diagonalizes these stiffness matrices is the magnitude of the off-diagonal terms divided by the diagonal terms, e.g., $$d = \sqrt{\frac{\Sigma_{i \neq j}(\tilde{K}_{i,j} - I_{i,j})^2}{\Sigma_{i=j}(\tilde{K}_{i,j} - I_{i,j})^2}} \tag{40}$$

Note that the small variations on the left-hand side of FIGS. 5a and 5b are due to edge effects and were not included in calculating the diagonalizing measure d. For the thin-plate stiffness matrix this ratio is approximately 0.0625, and for the three-node stiffness matrix this ratio is approximately 0.0382. In consequence we can expect that the equilibrium solutions for $\tilde{K}_{thin\,plate} U = R$, $\tilde{K}_{three}$ $_{node}U = R$, and $K_w U = R$ will all be within a few percent of each other.

Other embodiments are within the following claims. For example, the above-described principles are also applicable to regularization problems, which are important in a variety of applications, including interpolation problems (called lofting in mechanical engineering) and the solution of ill-conditioned inverse problems. For a discussion of regularization theory see, for example, T. Poggio et al. "Computational vision and regularization theory", *Nature*, Vol. 317, pp 314–319 (Sep. 26, 1985).

Like the FEM, regularization problems are also formulated as a minimization defined over a set of n nodes which typically form a two-dimensional mesh that is initially flat. A priori boundary conditions provide constraints on some of the nodal positions via a penalty term P, an $n \times 1$ vector. The elements of the penalty term, $p_i$, are typically either the squared difference between the initial conditions on certain nodal positions $d_i$ and the current nodal displacement $u_i$ (when boundary conditions exists for that node) or zero, $$p_i = \begin{cases} (u_i - d_i)^2 & \text{boundary conditions exists for node } i \\ 0 & \text{no boundary conditions exist.} \end{cases} \quad (41)$$

Because the boundary conditions are normally incomplete (and may be noisy), a regularizing or interpolating term $K(U)$ is introduced, to form the following energy functional:

$$E(U) = K(U) + P(U) \quad (42)$$

where $E(U)$ is the error functional to be minimized over all possible nodal displacements U. The effect of this minimization is to interpolate a smooth surface between boundary-condition nodes, and to reduce the effects of measurement noise in the boundary conditions. Normally a scalar constant $\lambda$ is introduced to control the effect of the regularizing term relative to the penalty term, e.g., $$E(U) = \lambda K(U) + P(U) \quad (43)$$

Minimization of this functional is accomplished by taking the variational derivative $\delta_u$, to obtain $$\lambda \delta_u K(U) + \delta_u P(U) = 0 \quad (44)$$

After discretization the regularization term is $K_\delta U = -\delta_u K(U)$ where $K_\delta$ is an $n \times n$ matrix that relates each nodes displacement to the displacements of the surrounding nodes, and the penalty term $P\delta(U) = \delta_u P(U)$ is an $n \times 1$ vector $$p_i = \begin{cases} d_i - u_i & \text{boundary conditions exists for node } i \\ 0 & \text{no boundary conditions exist.} \end{cases} \quad (45)$$

Thus the final systems of equations to be solved is:

$$\lambda K_\delta U - P_\delta(U) = 0 \quad (46)$$

Equation 46 is quite similar to the FEM equilibrium equations, as can be seen by a change of notation. Letting $$K = K_{67} \quad R - SU = P_\delta(U) \quad (47)$$

where S is a diagonal "selection matrix" with one's for nodes with boundary conditions, and zeros elsewhere. With this change of notation the regularization problem given by Eq. 46 may be written:

$$\lambda KU + SU = R \quad (48)$$

In the FEM the calculation of K is accomplished by integrating material properties over a set of nodes using smooth interpolant functions. The resulting stiffness matrix are very similar to the stiffness matrix $K_\delta$ used in regularization problems. A major difference is that $K_\delta$ is standardly derived using a finite difference scheme rather than a finite element technique. The thin-plate regulation matrix is very similar to the two-node REM stiffness matrix.

In mechanical engineering, the interpolation problem is referred to as lofting, and is posed as the problem of fitting a smooth surface through a sparse set of possibly-noisy control points. This also a good example of one type of problem where regularization techniques are often applied.

In the case that every node is a control point, so that the only problem is to remove measurement noise, the finite element equilibrium solution may be trivially extended to the regularization problem. In this case the regularization problem is:

$$\lambda KU + SU = R \quad (49)$$

where $S = I$, the identity matrix.

Substituting $U = \Phi_w \tilde{U}$ and premultiplying by $\Phi_w^T$ converts Eq. (49) to:

$$\lambda \Phi_w^T K \Phi_w U + \Phi_w^T \Phi_w \tilde{U} = \Phi_w^T R \quad (50)$$

or equivalently:

$$(\lambda \tilde{K} + I) U = \Phi_w^T R, \quad (51)$$

where $\tilde{K}$ is a diagonal matrix. The regularized solution U is therefore $$U = \Phi_w \tilde{K}_{+I}^{-1} \Phi_w^T R \quad (52)$$

where $$\tilde{K}_{+I}^{-1} = \begin{bmatrix} (\lambda \omega_1^2 + 1)^{-1} & & & \\ & (\lambda \omega_2^2 + 1)^{-1} & & \\ & & \ddots & \\ & & & (\lambda \omega_n^2 + 1)^{-1} \end{bmatrix} \quad (53)$$

In the more normal case where not all nodes are control points, the regularization solution can be obtained interatively. In this case the sampling matrix S is diagonal with ones for nodes that are control points, and zeros elsewhere. Again substituting $U = \Phi_w \tilde{U}$ and premultiplying by $\Phi_w^T$ converts Eq. 50 to:

$$\lambda \Phi_w^T K \Phi_w U + \Phi_w^T S \Phi_w \tilde{U} = \Phi_w^T R \quad (54)$$

The matrix $\Phi_w^T S \Phi_w$ is not diagonal unless $s=I$. It is, however, strongly diagonally dominant, so that the regularized solution U may be obtained by iterating:

$$U^{t+1} = \Phi_w \tilde{K}_{+S}^{-1} \Phi_w^T R^t \quad (55)$$

where $$\tilde{K}_{+S}^{-1} = \begin{bmatrix} [(\lambda\omega_1^2/d) + s_1]^{-1} & & & \\ & [(\lambda\omega_2^2/d) + s_2]^{-1} & & \\ & & \ddots & \\ & & & [(\lambda\omega_n^2/d) + s_n]^{-1} \end{bmatrix} \quad (56)$$

and $s_i$ is the $i^{th}$ diagonal entry of $\Phi_w^T S \Phi_w$ and d is the fraction of nodes that are control points.

Figure 6A:
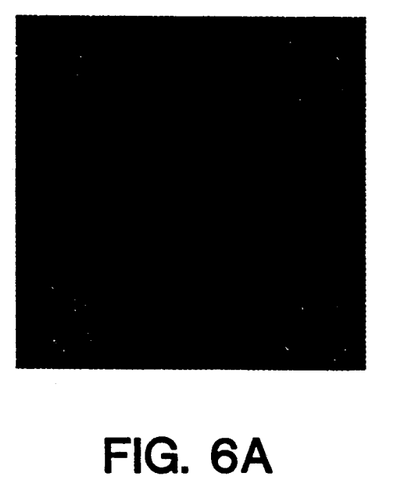
FIG. 6a shows a sparse sampling of a test function.
Figure 6B:
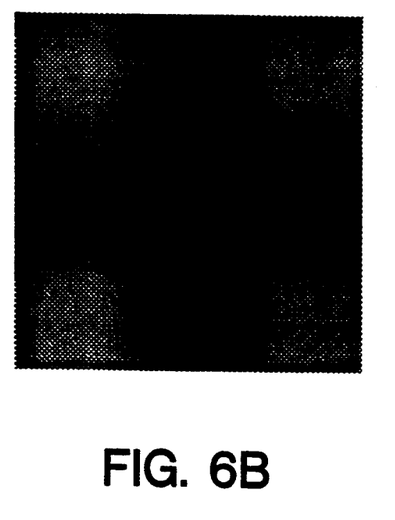
Figure 6C:
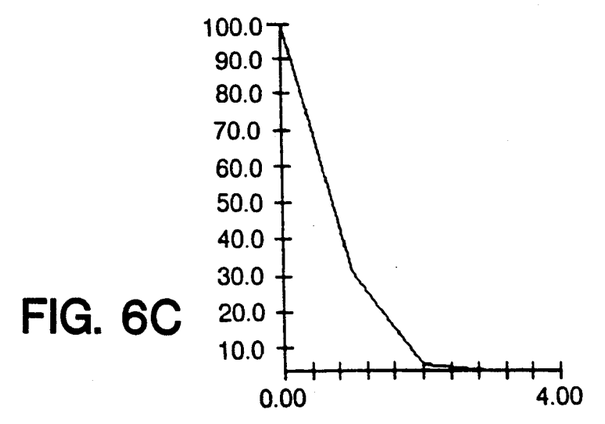
FIG. 6c shows the convergence of the iterative process.

FIGS. 6a-c illustrate an example of lofting a surface using the regularization approach. FIG. 6a shows a sparse (10%) sampling of the function $z=100[\sin(kx)+\sin(ky)]$ on a $128\times 128$ grid.

The lofted surface is obtained by iterative application of Eq. 55. The first step is to obtain the values $s_i$ by computing a QMF pyramid of the sampling function S. A QMF pyramid is then computed for the current difference $R^t$ between the control points and the current surface estimate $U^t$. The elements i of this pyramid are then multiplied by the values $[(\lambda w_i^2/d)+s_i]^{-1}$, and the pyramid collapsed to obtain $U^{t+1}$, the new estimate of the surface.

Normally three to five iterations are required to obtain an accurate estimate of the regularization surface. FIG. 6b shows the result of this iterative process on the data of FIG. 6a. FIG. 6c shows the convergence of this process. The vertical axis is percent RMS difference between final solution and the current surface estimate, and the horizontal axis is iteration number. After three iterations the surface had converged to within 1% of its final equilibrium state. Approximately 12 seconds of computer time on a Sun 4 was required to obtain this $128\times 128$ node surface.

Figure 7:
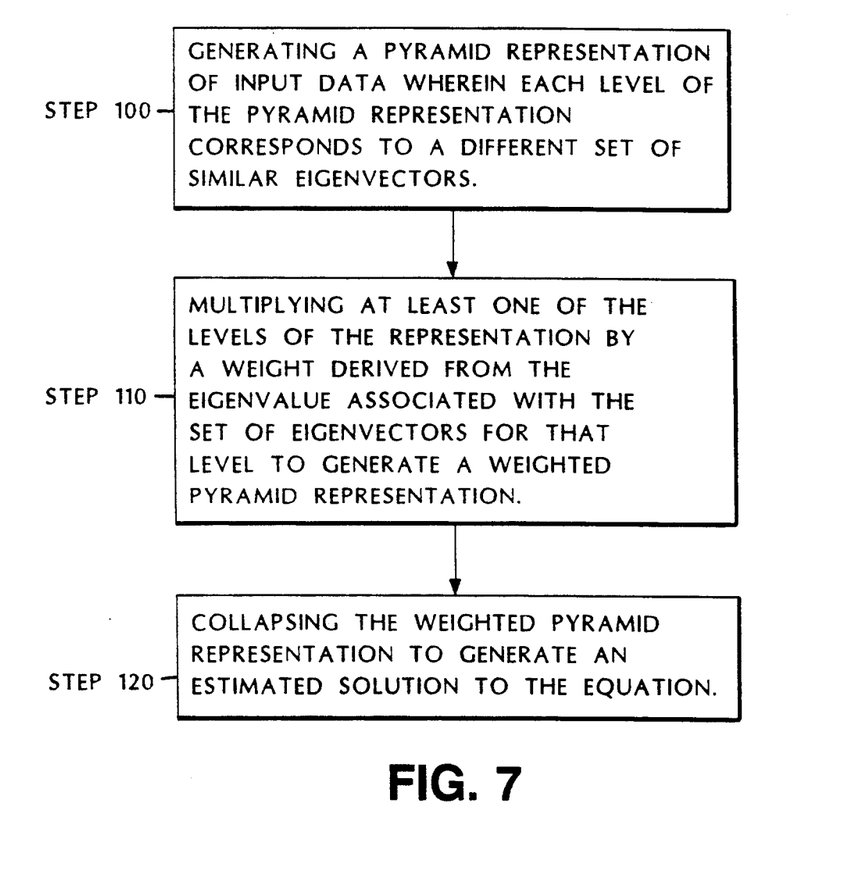
FIG. 7 summarizes the steps of the invention.

FIG. 7 summarizes the general steps of the above-described method for estimating the solution to a finite element and/or regularization analysis equation. The method includes generating a pyramid representation of input data wherein each level of the pyramid representation corresponds to a different set of similar eigenvectors (step 100); multiplying at least one of the levels of the representation by a weight derived from the eigenvalue associated with the set of eigenvectors for that level to generate a weighted pyramid representation (step 110); and collapsing the weighted pyramid representation to generate an estimated solution the equation (step 120).

What is claimed is:

1. An apparatus for estimating a solution to a finite element and/or regularization analysis equation, the apparatus comprising:

an analysis filter circuit generating a pyramid representation of input data, each level of said pyramid representation corresponding to a different set of similar eigenvectors;

a multiplier circuit connected to said analysis filter circuit, said multiplier circuit receiving the pyramid representation of input data and multiplying at least one of said levels of said representation by a weight derived in part from an eigenvalue associated with the set of eigenvectors for that level to generate a weighted pyramid representation; and a synthesis filter circuit connected to said multiplier circuit, said synthesis filter receiving said weighted pyramid representation and collapsing said weighted pyramid representation to generate an estimated solution to the equation wherein said analysis filter circuit comprises a plurality of quadrature mirror analysis filter, each of said plurality of quadrature mirror analysis filters generating a low frequency output and a high frequency output and wherein each level of the pyramid representation above a lowest level is derived by applying the corresponding quadrature mirror analysis filter to the low frequency output of a next lower level.

2. The apparatus of claim 1 wherein the different sets of eigenvectors are selected from an orthogonal set of basis functions.

3. The apparatus of claim 2 wherein members of the set of similar eigenvectors for a given level includes translated versions of each other.

4. The apparatus of claim 3 wherein at least some members of the set of similar eigenvectors for each level are scaled versions of the members of the set of similar eigenvectors for a neighboring level.

5. The apparatus of claim 2 wherein said basis set comprises wavelets.

6. The apparatus of claim 1 wherein each of said plurality of quadrature mirror analysis filters is the same.

7. The apparatus of claim 1 wherein said synthesis filter circuit comprises a plurality of quadrature mirror synthesis filters.

8. The apparatus of claim 1 wherein the weight for each level is characterized by the following matrix:

$$\begin{bmatrix} \omega_{1,1}^{-2}, & & & \\ & \omega_{1,2}^{-2}, & & \\ & & \ddots & \\ & & & \omega_{1,j}^{-2} \end{bmatrix}$$

where l is an integer identifying the level, j is a number identifying a node for that level and $\omega_{1,j}^2$ is the eigenvalue associated with the eigenvector for level 1 and node j.

9. The apparatus of claim 8 wherein $\omega_{1,j}^2 = \omega_1^2$ for all j at level 1.

10. A computer implemented method for estimating a solution to a finite element and/or regularization analysis equation, the method comprising the steps of:

generating a pyramid representation of input data, each level of said pyramid representation corresponding to a different set of similar eigenvectors;

multiplying at least one of said levels of said representation by a weight derived from an eigenvalue associated with the set of eigenvectors for that level to generate a weighted pyramid representation; and collapsing said weighted pyramid representation to generate an estimated solution to the equation wherein said generating step is performed by a plurality of quadrature mirror analysis filters generating a low frequency output and a high frequency output and wherein each said level of the pyramid representation above a lowest level is derived by applying the corresponding quadrature mirror analysis filter to the low frequency output of a next lower level.

11. The method of claim 10 wherein said pyramid representation is generated by using quadrature mirror analysis filters.

12. The method of claim 10 wherein said weighted pyramid representation is collapsed by using quadrature mirror synthesis filters.

13. The method of claim 10 wherein the different sets of eigenvectors are selected from an orthogonal set of basis functions.

14. The method of claim 13 wherein members of the set of similar eigenvectors for a given level includes translated versions of each other.

15. The method of claim 14 wherein at least some members of the set of similar eigenvectors for each level are scaled versions of the members of the set of similar eigenvectors for a neighboring level.

16. The method of claim 13 wherein said basis set comprises wavelets.

17. The method of claim 10 wherein the weight for each level is characterized by the following matrix:

$$\begin{bmatrix} \omega_{1,1}^{-2}, & & & \\ & \omega_{1,2}^{-2}, & & \\ & & \ddots & \\ & & & \omega_{1,j}^{-2} \end{bmatrix}$$

where 1 is an integer identifying the level, j is a number identifying a node for that level and $\omega_{1,j}^2$ is the eigenvalue associated with the eigenvector for level 1 and node j.

18. The method of claim 17 wherein $\omega_{1,j}^2 = \omega_1^2$ for all j at level 1.

* * * * *

UNITED STATES PATENT AND TRADEMARK OFFICE
CERTIFICATE OF CORRECTION

PATENT NO. : 5,287,529

DATED : February 15, 1994

INVENTOR(S) : Alex P. Pentland

It is certified that error appears in the above-identified patent and that said Letters Patent is hereby corrected as shown below:

Col. 2, line 14 replace "mk" with --$m_k$--;

Col. 2, line 23 replace "premulti" with --premultiplying--;

Col. 2, line 24, "MÜ" with --$M\ddot{U}$--;

Col. 3, line 24 after "apparent" insert --that matrix $\Phi$--;

Col. 3, line 68, replace "w" with --W--;

Col. 6, line 30, replace "$K_2\Phi$" with --$K_w = \Phi$--;

Col. 6, line 42, replace "U)" with --$\tilde{U}$)--;

Col. 6, line 60, replace "U=U" with --$\tilde{U}=U$--;

Col. 7, line 20, replace "RR" with --R--;

Col. 7, line 36, replace "With" with --with--;

Col. 7. line 49, replace "2↓" with --2↑--;

Col. 8, line 14, replace "U" (first occurrence) with --$\hat{U}$--;

Col. 8, line 28, replace "$\tilde{U}$" with --$\hat{U}$--;

Col. 9, line 7, replace "1" with --$w_1$--;

Col. 9, line 36, replace "$K_2$" with --$K_w$--;

UNITED STATES PATENT AND TRADEMARK OFFICE
CERTIFICATE OF CORRECTION

PATENT NO. : 5,287,529

DATED : February 15, 1994

INVENTOR(S) : Alex P. Pentland

It is certified that error appears in the above-identified patent and that said Letters Patent is hereby corrected as shown below:

Col. 9, line 44, replace "(34" with --(34);

Col. 9, line 46, change "function" to read --functions H and--;

Col. 9, line 54, replace each occurrence of "$\phi$" with --$\varphi$--;

Col. 9, line 56, replace each occurrence of "$\phi$" with --$\varphi$--;

Col. 9, line 59, replace each occurrence of "$\phi$" with --$\varphi$--;

Col. 9, line 61, replace each occurrence of "$\phi$" with --$\varphi$--;

Col. 9, line 63, replace each occurrence of "$\phi$" with --$\varphi$--;

Col. 9, line 66, replace each occurrence of "$\phi$" with --$\varphi$--;

Col. 10, line 10, replace each occurrence of "$\phi$" with --$\varphi$--;

Col. 10, line 16, replace each occurrence of "$\phi$" with --$\varphi$--;

Col. 10, line 48, replace "K" (first occurrence) with --$\overline{K}$--;

UNITED STATES PATENT AND TRADEMARK OFFICE
CERTIFICATE OF CORRECTION

PATENT NO.    : 5,287,529

DATED         : February 15, 1994

INVENTOR(S)   : Alex P. Pentland

It is certified that error appears in the above-identified patent and that said Letters Patent is hereby corrected as shown below:

Col. 10, line 49, replace "K" (first occurrence) with --$\bar{K}$--;

Col. 12, line 1,  replace "$K_{67}$" with --$K_6$--;

Col. 12, line 19, replace "REM" with --FEM--;

Col. 12, line 38, replace "U" with --$\bar{U}$--;

Col. 12, line 41, replace "U" with --$\bar{U}$--;

Col. 12, line 66, replace "U" with --$\bar{U}$--;

Signed and Sealed this

First Day of August, 1995

BRUCE LEHMAN

Attest:

Attesting Officer

Commissioner of Patents and Trademarks